US012481282B2

(12) United States Patent
Puura et al.

(10) Patent No.: US 12,481,282 B2
(45) Date of Patent: Nov. 25, 2025

(54) UNDERGROUND VEHICLE MONITORING SYSTEM FIELD

(71) Applicant: SANDVIK MINING AND CONSTRUCTION OY, Tampere (FI)

(72) Inventors: Jussi Puura, Tampere (FI); Samuel Hyyppa, Tampere (FI); Lauri Siivonen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 92 days.

(21) Appl. No.: 18/027,471

(22) PCT Filed: Sep. 23, 2021

(86) PCT No.: PCT/EP2021/076211
§ 371 (c)(1),
(2) Date: Mar. 21, 2023

(87) PCT Pub. No.: WO2022/063903
PCT Pub. Date: Mar. 31, 2022

(65) Prior Publication Data
US 2023/0376040 A1 Nov. 23, 2023

(30) Foreign Application Priority Data
Sep. 24, 2020 (EP) .................................... 20198251

(51) Int. Cl.
G05D 1/00 (2024.01)
G08G 1/0968 (2006.01)

(52) U.S. Cl.
CPC ......... G05D 1/0214 (2013.01); G05D 1/0274 (2013.01); G05D 1/0291 (2013.01); G08G 1/096855 (2013.01)

(58) Field of Classification Search
CPC .............................................. G08G 1/096855
See application file for complete search history.

(56) References Cited

U.S. PATENT DOCUMENTS

| 6,393,362 | B1 | 5/2002 | Burns | |
| 11,499,325 | B2* | 11/2022 | Telleria | ................. B25J 9/1661 |
| 2016/0223350 | A1* | 8/2016 | Lewis | ................. G07C 5/0841 |
| 2016/0370802 | A1* | 12/2016 | Ueda | ................... G05D 1/0214 |
| 2017/0313332 | A1* | 11/2017 | Paget | ................. B61L 15/0072 |
| 2020/0047343 | A1* | 2/2020 | Bal | ....................... B25J 9/1689 |

FOREIGN PATENT DOCUMENTS

| EP | 2631729 A1 | 8/2013 | |
| WO | 0188827 A1 | 11/2001 | |
| WO | WO-2011141629 A1 * | 11/2011 | ............. E21C 35/08 |

* cited by examiner

Primary Examiner — Wade Miles
Assistant Examiner — Aaron G Cain
(74) Attorney, Agent, or Firm — Corinne R. Gorski

(57) ABSTRACT

According to an example aspect, there is provided a method, comprising the steps of obtaining route plan information indicative of a set of route points for a tunnel system of an underground worksite for at least partially autonomous driving of a vehicle, performing for at least some of route points in the set: detecting space information indicative of spaces required by the vehicle at associated route points, generating a set of envelopes on the basis of the space information, wherein an envelope is indicative of space required by the vehicle at an associated route point, and controlling visualization of the set of envelopes in a tunnel model to represent planned route trace of the vehicle when driving via the route points.

15 Claims, 6 Drawing Sheets

UNDERGROUND VEHICLE MONITORING SYSTEM FIELD

RELATED APPLICATION DATA

This application is a § 371 National Stage Application of PCT International Application No. PCT/EP2021/076211 filed Sep. 23, 2021 with priority to EP 20198251.9 filed Sep. 24, 2020.

FIELD

The present invention relates to monitoring for underground vehicles, in particular for autonomously operating vehicles tasked to perform drive orders at a worksite.

BACKGROUND

Mining or construction excavation worksites, such as underground hard rock or soft rock mines, may comprise areas for automated operation of mobile work machines, such as load and/or haul machines and drilling rigs, which may also be referred to as (mine) vehicles. Such vehicles may be an unmanned, e.g. remotely controlled from a control room, or a manned mine vehicle, i.e. operated by an operator in a cabin of the vehicle. Vehicles may be configured to perform at least some of tasks autonomously. An automated work machine operating in an automatic mode may operate independently, without external control at least for some portion(s) of a work task or drive order, but may be taken under external control at certain operation areas or conditions, such as during states of emergencies.

A worksite and the autonomously operating vehicles at the worksite may comprise large number of mobile and fixed sensors continuously collecting data related to or affecting operations in the mine operations. Such data may be referred to as mining operations data and comprise vehicles operations status data (e.g. speed, position at worksite, motor parameter, load, etc.) and/or tunnel environment data (e.g. temperature, air condition etc.), for example. The data may be transferred to a data processing system, which may be configured to provide a mine operations control system, comprising a user interface for a user of the system, which may be referred to as an operator. Positions of vehicles performing their drive orders may be indicated for the operator monitoring the vehicles and manually controlling a vehicle when needed. Mines may be very large and complex with a fleet of simultaneously operating vehicles monitored by the operator.

SUMMARY

According to a first aspect of the present invention, there is provided an apparatus, comprising: means configured for performing: obtaining route plan information, indicative of a set of route points for a tunnel system of an underground worksite for at least partially autonomous driving of a vehicle, wherein he means are further configured for performing for at least some of route points in the set: detecting space information indicative of spaces required by the vehicle at associated route points, generating a set of envelopes on the basis of the space information, wherein an envelope is indicative of space required by the vehicle at an associated route point, and controlling visualization of the set of envelopes in a tunnel model to represent planned route trace of the vehicle when driving via the route points.

According to a second aspect of the present invention, there is provided a method for facilitating autonomously operating vehicle monitoring and control, comprising: obtaining route plan information, indicative of a set of route points for a tunnel system of an underground worksite for at least partially autonomous driving of a vehicle, further comprising performing for at least some of route points in the set: detecting space information indicative of spaces required by the vehicle at associated route points, generating a set of envelopes on the basis of the space information, wherein an envelope is indicative of space required by the vehicle at an associated route point, and controlling visualization of the set of envelopes in a tunnel model to represent planned route trace of the vehicle when driving via the route points.

Embodiments of the method include various embodiments of the apparatus of the first aspect.

According to a third aspect, there is provided an apparatus comprising at least one processor, at least one memory including computer program code, the at least one memory and the computer program code being configured to, with the at least one processor, cause the apparatus at least for performing: obtaining route plan information, indicative of a set of route points for a tunnel system of an underground worksite for at least partially autonomous driving of a vehicle, further comprising performing for at least some of route points in the set: detecting space information indicative of spaces required by the vehicle at associated route points, generating a set of envelopes on the basis of the space information, wherein an envelope is indicative of space required by the vehicle at an associated route point, and controlling visualization of the set of envelopes in a tunnel model to represent planned route trace of the vehicle when driving via the route points.

According to a fourth aspect, there is provided a computer program, a computer program product or computer-readable medium comprising computer program code for, when executed in a data processing apparatus, to cause the apparatus to perform the method or an embodiment thereof.

EMBODIMENTS

Figure 1:
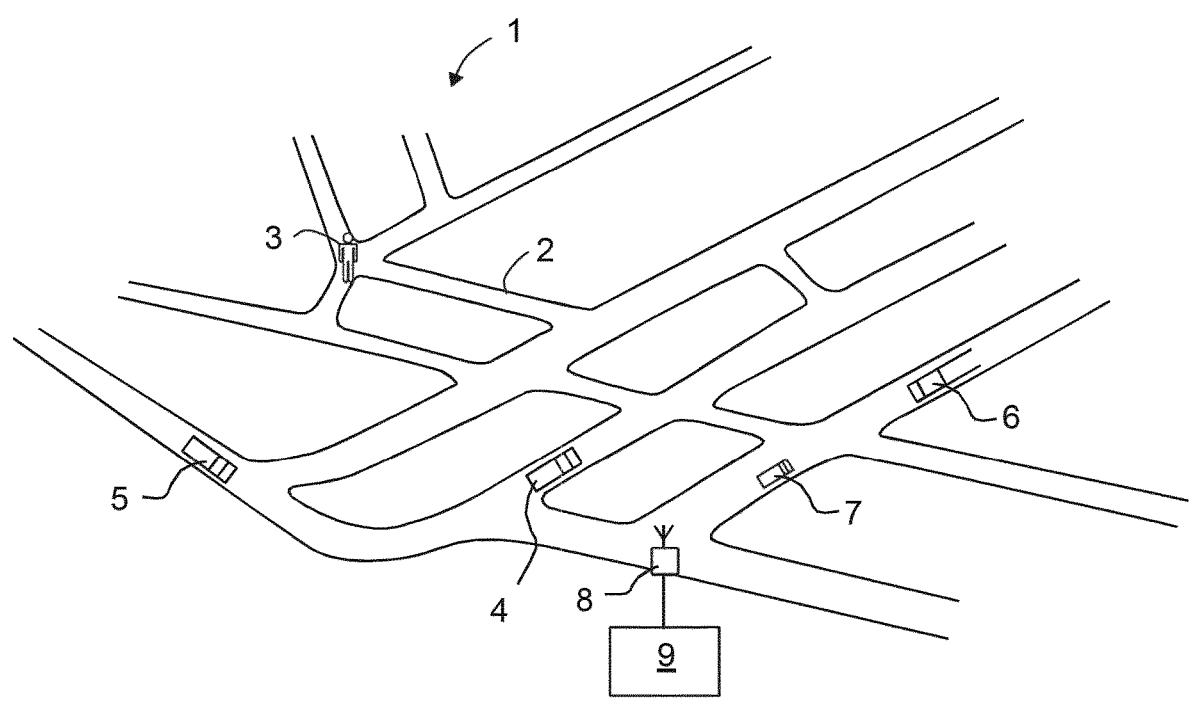
FIG. 1 illustrates an example of an example of an underground mine.

FIG. 1 illustrates a simplified example of an underground worksite 1, in the present example an underground mine comprising a network 2 of underground tunnels. A plurality of mobile objects, such as persons or pedestrians 3 and/or mobile work machines 4, 5, 6, 7, below also referred to as vehicles, may be present in and move between different areas or operation zones of the worksite 1.

The term mine herein is intended to include a variety of underground or surface excavation worksites. The vehicle may be any type of mobile work machine suitable to be used in mine operations, such as lorries, dumpers, vans, mobile rock drilling or cutting rigs, mobile reinforcement machines, and bucket loaders. The vehicle may be an automated work machine, which in its autonomous operating mode may operate/drive independently without requiring continuous user control but which may be taken under external control during states of emergencies, for example.

The worksite 1 comprises a communications system, such as a wireless access system comprising a wireless local area network (WLAN) and/or a cellular communications network (e.g. a 4G, 5G or another generation cellular network), comprising a plurality of wireless access nodes 8, such as WLAN access points or cellular base stations. The access nodes 8 may communicate with wireless communications units comprised by the work machines or carried by the pedestrians and with further communications devices (not shown), such as network device(s) configured to facilitate communications with an on-site (underground or aboveground) and/or remote control system 9.

The system 9 may comprise or be connected to a further network(s) and/or data processing system(s), such a worksite management system, a cloud service, a data analytics device/system, an intermediate communications network, such as the internet, etc. The system may comprise or be connected to further device(s) or control unit(s), such as a handheld user unit, a vehicle unit, a worksite management device/system, a remote control and/or monitoring device/system, data analytics device/system, sensor system/device, etc.

For example, a server of the system 9 may be configured to manage at least some operations at the worksite, such as provide a UI for an operator to remotely monitor and, when needed, control automatic operation operations of the work machines and/or assign work tasks for a fleet of vehicles and update and/or monitor task performance and status. Thus, the work machine may be unmanned, the user interface may be remote from the work machine, and the work machine may be remotely monitored or controlled by an operator in proximity to the work machine (e.g. in the tunnel), or in a control room at the worksite or even long distance away from the worksite via communications network(s).

The worksite 1 may further comprise various other types of mine operations devices connectable to the control system 9 e.g. via the access node 8, not further illustrated in FIG. 1. Examples of such further mine operations devices include various devices for power supply, ventilation, air condition analysis, safety, communications, and other automation devices. For example, the worksite may comprise a passage control system comprising passage control units (PCU) separating operation zones, some of which may be set-up for autonomously operating work machines. The passage control system and associated PCUs may be configured to allow or prevent movement of one or more work machines and/or pedestrians between zones.

A 3D (tunnel) model of the underground worksite may be generated and stored in the control system 9, illustrating floors, walls, and ceilings of the tunnel. The 3D model may comprise or be formed based on point cloud data generated on the basis of scanning the tunnel system. The 3D model may be stored in a database accessible by one or more modules of a computing apparatus, such as a tunnel model processing module, a user interface or visualizer module, a route planning module, and/or a positioning service module. In other embodiments, the 3D model may be a design model or may be generated on the basis of a design model, such as a CAD model, created by a mine designing software or a 3D model created on the basis of tunnel lines and profiles designed in a drill and blast design software, such as iSURE®. Thus, same analysis or processing can be done on measured or initial planned model of the tunnel system.

In complex 3D environments, such as underground mines, using the full 3D model of the tunnel system may be too complex and resource consuming. For example, more efficient route calculation or location tracking of vehicles or pedestrians is achieved on a map that only comprises the floor of the mine, possibly with attributes associated with some or all of the floor points. The term floor model refers generally to a model comprising a set of points indicative of the tunnel floor at least in horizontal plane, i.e. 2D or x, y coordinates. Such points may also be referred to as floor points. The 3D model of the tunnel may comprise point cloud data generated on the basis of scanning the tunnel and the floor model is a point cloud model of the floor comprising a sub-set of points extracted from the 3D point cloud data for representing the floor of the tunnel. The floor model may be applied as a map for the mobile object movement tracking as presently disclosed, and the floor points may thus be considered as map points. The floor model may be applied as a map for the mobile object movement tracking as presently disclosed, and the floor points may thus be considered as map points. The floor model may comprise also vertical plane, i.e. height or z coordinate data and/or supplementary data for at least some of the floor points.

Thus, the tunnel model applied for worksite and route plan visualization may comprise only part of the full 3D model, such as the floor model defining floor level points and possibly also walls (or wall points). Further, the visualization may be based on 2D model or representation of the tunnel system.

A driving plan, or a route plan or driver order, may define a route to be driven by a vehicle 4-7 and may be used as an input for automatic control of the vehicle. The plan may define a start point, an end point, and a set of route points for the automatic drive. A route point entry may comprise at least 2D coordinates of the route point, but may also comprise vertical coordinate or vertical layer indication. Route point entries may also comprise further information, such as speed information or obstacle and/or safety control related information. The plan may comprise information of loading area or point and may comprise data for controlling loading of the bucket. The plan and included route point positions may be defined on the basis of teach drive performed by manually driving the vehicle or computationally on the basis of operator input, the tunnel model and vehicle dimensions information. The plan may be sent via a wired or wireless connection to, or otherwise loaded to the vehicle, to a memory of the vehicle for access by a control unit of the vehicle.

A vehicle, e.g. vehicle 4, may be provided with an obstacle detection function or unit, which may be part of a collision avoidance or prevention system. The obstacle detection function may be configured to perform collision examination based on scanning data received from at least scanner configured to perform scanning of the environment of the vehicle. For example, one scanner may cover a rear portion of the vehicle and another scanner may cover a front section of the vehicle by directional beams. The scanner may be a 3D scanner, in which case 3D scanning data, e.g. point cloud data is produced. The scanner may be a laser scanner or another type of sensor device, such as 4D or another type of radar, appropriate for determining obstacles and distances to obstacles for the vehicle. The obstacle detection may apply one or more obstacle detection or safety areas around the vehicle. If an object is detected as an obstacle in the area, the vehicle may be stopped.

The scanning results may be applied to detect position and orientation of the vehicle 4 and one or more further elements thereof, such as the scanner or a bucket. A control unit in the vehicle may compare operational scanned tunnel profile data to reference profile data stored in the tunnel model and position the vehicle on the basis of finding a match in the environment model to position the vehicle and/or correct positioning by dead-reckoning. The vehicle may comprise a simultaneous localization and mapping (SLAM) unit configured to both position the vehicle and (augment) map the environment on the basis of (2D or 3D) scanning information while the vehicle is driving.

The vehicle 4 may be unmanned. Thus, the user interface may be remote from the vehicle and the vehicle may be remotely controlled by an operator in the tunnel, or in control room at the mine area or even long distance away from the mine via communications network(s). A control unit outside the vehicle, for example in the control system 9 may be configured to perform at least some of the below illustrated features. However, at least some of the below features may be performed on-board the vehicle.

It may be very challenging for an operator to monitor several simultaneously operating and driving mine vehicles in an underground worksite, which may be very large and complex. Several mine portions or driving situations, such as loading operation, unloading operation, or driving through narrow passage portions may require operator's attention simultaneously, and the operator needs based on his/her experience to prioritize and select which mine portions and situations are such that need his/her attention and potentially manually controlling the vehicle. There are now provided improvements for monitoring autonomously operating mine vehicles tasked to perform drive orders in an underground worksite.

Figure 2:
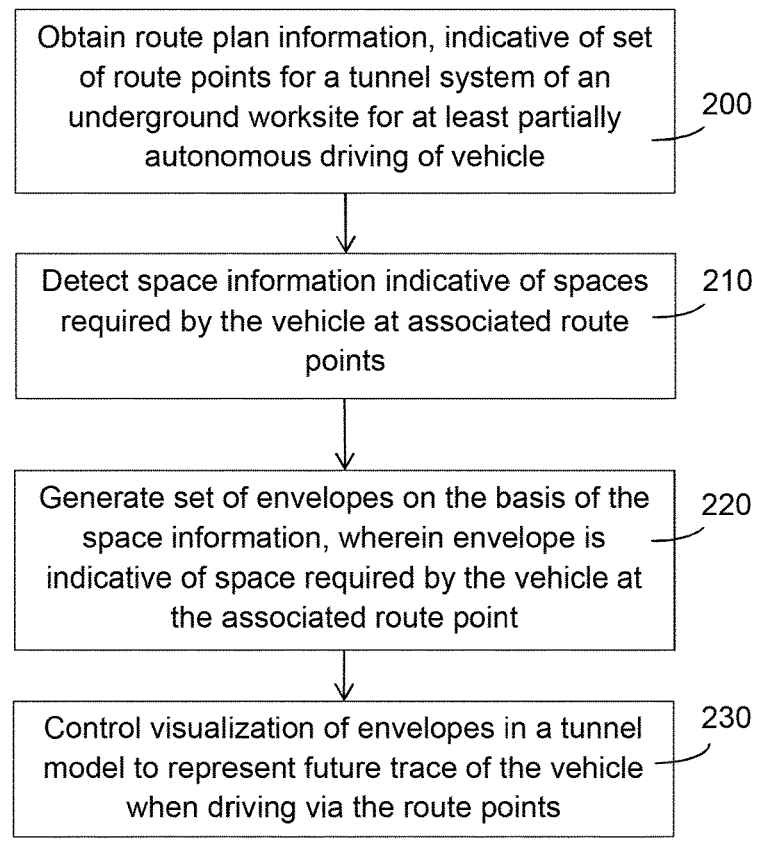
FIG. 2 describes a method according to at least some embodiments.

FIG. 2 illustrates a method according to some embodiments. The method may be performed by a mine control system or apparatus, such as a device of the control system 9, and at least one processing unit therefor. The method may be implemented by an apparatus configured for processing a route plan and generating a visualization of planned or already driven route, such as a server, a worksite operator, designer, or controller workstation, a mobile unit, such as a mobile cellular device or other type of mobile communications device, a vehicle on-board control device, or other kind of appropriately configured data processing device. The apparatus may be configured to perform a UI generation algorithm which may carry out a route and vehicle passage visualization procedure.

The method comprises obtaining 200 route plan information, indicative of (positions of) a set of route points for a tunnel system of an underground worksite for at least partially autonomous driving of a vehicle. The route plan information may define at least two-dimensional coordinates for the route points. The route plan information may be obtained by receiving the route plan information from another device, a route planning unit or module, or memory, for monitoring during the driving of the vehicle, for example. The route plan information may be obtained by generating the route plan information in block 200, and the route plan generation and the subsequent visualization related features may thus be performed together.

Space information indicative of spaces required by the vehicle at associated route points in the set is detected 210. This may comprise receiving the space information or computing (expected) space based on outer vehicle dimensions and (expected) state of the vehicle at the associated route points, some further example embodiments being illustrated below. The space information may be defined for at least some of route points in the set, e.g. for each route point in the set. The space information may comprise (route point specific) records, each identifying the route point and defining space required by the vehicle at the given or corresponding route point.

For at least some of route points in the set, e.g. for each route point in the set of route points, a set of (route-point specific) envelopes are generated 220 on the basis of the space information. An envelope in the set is thus indicative of space required by the vehicle at an associated (or corresponding) route point. The route point, or another point of reference dependent on the route point, may be used as reference for the envelope. The route point or the reference point may be center point of the vehicle (or vehicle portion) expected when at the respective position in the tunnel, around which the envelope may be generated (based on the vehicle dimensions data and state of the vehicle).

Block 230 comprises controlling visualization of the set of envelopes in a tunnel model to represent planned route trace of the vehicle when driving via the route points. This may comprise or refer to displaying a visualization of the trace based on the set of envelopes together with (and mapped to) visualization of related tunnel portion based on tunnel (or environment) model data. Hence, the space required by the vehicle at a set of route points along the route ahead may be illustrated to facilitate proactive monitoring and control of the vehicle well before the vehicle arrives at the give route points.

The planned route trace may refer generally to illustration of space to be required by the vehicle in forthcoming of future route, when the vehicle will drive via the route points. The planned route trace may also be referred to as a trace along the future route (points), or future/upcoming route (vehicle) trace or footprint, for example. To indicate the planned route (or upcoming) vehicle trace, graphical user interface (GUI) elements may thus be generated in block 230 on the basis of the set of envelopes. In a simple example embodiment, the set of envelopes in the set are combined to form a substantially uniform and continuous GUI form/element to represent the planned route trace. The size of the visualized planned route trace at a given route point is thus dependent on the space required by the vehicle at the given route point.

The envelope may generally refer to a 2D or 3D area indicative of space required by the vehicle at the associated route position. The envelope may thus extend from outside outer dimensions of the vehicle to visualize the space the vehicle is expected to require at the route point. An envelope GUI element, the size of which is dependent on the space required by the vehicle at the route point, may be applied to visualize a given envelope. For a route point in which the vehicle is currently positioned, the envelop GUI element may be aligned with vehicle GUI element or model and displayed (at least partially) around or surrounding the vehicle GUI element or model. The envelopes and/or resulting traces may be displayed when the real vehicle is driving the route or when the vehicle driving is simulated or tested e.g. when designing the route plan. However, the envelopes and/or traces may be visualized independent of the vehicle representation or position, to show the upcoming and also past coverage area (or trace) required for the vehicle at different route portions.

It is to be noted that various further information, e.g. as zones, or further envelopes and resulting traces may be applied and also displayed. An example of such zone which may be displayed at least partially around the vehicle, is an obstacle detection or safety zone applied for monitoring obstacles. An obstacle detection zone may have a minimum distance (from the vehicle outer dimension) outside the envelope, so as to prevent potential false obstacle detections due to the vehicle's own structures, such as movements of a boom, bucket, etc. In an example embodiment, the outer boundary of the envelope may serve as minimum distance or boundary of the obstacle detection zone. The route-point specific envelope is displayed to facilitate an operator to detect specific portions and route points ahead the route requiring special attention, control operation of the vehicle for such specific portions and route points, and/or modify the route plan information or vehicle control parameters for such specific portions and route points. The envelope may also be referred to as a route point specific sweeping area or location area affected by the vehicle at the route point.

It is to be noted that the envelope generation may be performed for each route point in the set of route points. Envelope generation may be repeated for all or some of route points of the route plan, i.e. envelopes may be (pre-) computed for the route points. Alternatively, these blocks may be repeated for route points upon need, e.g. during driving and dependent on progression of the vehicle (and the set may comprise even a single route point). Depending on set or operator-selected view option and the view being displayed, a planned route trace based on a selected set of route-point specific envelopes ahead in the driving direction of the vehicle (or even all along the route) may be displayed, and may be updated as the vehicle proceeds along the route.

Figure 3A:
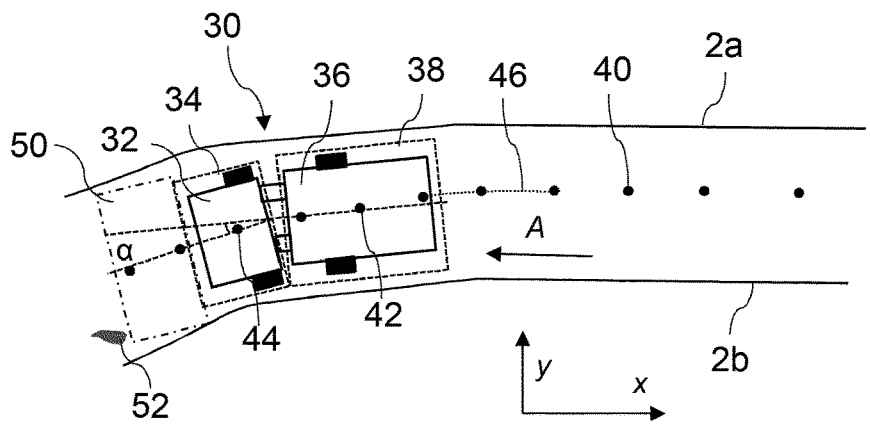
FIGS. 3a, 3b, 4a, and 4b illustrate simplified examples of a vehicle visualized in a tunnel.

FIG. 3a illustrates a simplified top display view example, in which a vehicle 30 is visualized driving between tunnel walls 2a, 2b along a route indicated by route points 40, 42, 44. The vehicle in this example is an articulated vehicle driving to direction A and comprising a front portion 32 and a rear portion 36 connected by a joint, such as loader or a load and haul (LHD) vehicle comprising a bucket (not separately shown). However, it will be understood that the present features may be applied for monitoring various other types of vehicles.

An envelope 34, generated based on the method of FIG. 2, is illustrated in front of the vehicle 30 (towards the driving direction). The envelope 34 may be specific to the route point 44. As the vehicle proceeds further, the display view is continuously updated, with the vehicle UI model being repositioned to a subsequent route point and the envelope being updated and defined in respect of the new route point. As also illustrated in FIG. 3, an obstacle 52 may be visualized. The obstacle may be detected on the basis of processing the tunnel model, or based on driving by an obstacle detection function monitoring an obstacle detection zone, visualized by indicator 50.

Figure 3B:
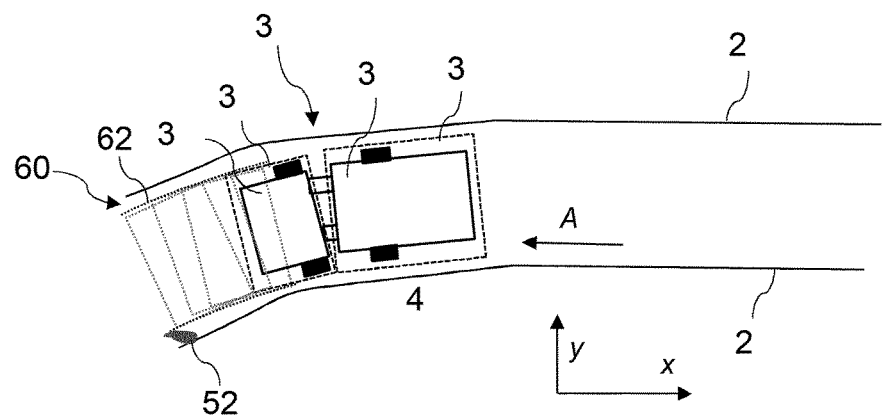

As further illustrated in simplified FIG. 3b, a set of envelopes 60 may be applied to visualize the planned route trace 62 of the vehicle ahead along the upcoming route, based on subsequent route points ahead in the driving direction. It is to be appreciated, although separate envelopes are illustrated, that a substantially uniform shape, e.g. limited by curve along the edges of the envelopes, may be generated and displayed based on the set of envelopes, so that separate envelopes are not shown. FIG. 3b illustrates only a small number of envelopes, but it will be appreciated that depending on selected view, much more envelopes and even for the complete route may be visualized.

Also other modifications and implementation options are available for the method, some of which are further illustrated below. For example, visualization of the route points in a tunnel model representative of the tunnel system may also be generated. Thus, route point indicators may be mapped into the tunnel model based on route point positions in the route plan information, e.g. as additional block before or after block 230.

The tunnel model and the space information of block 210 may be processed to detect at least one route point meeting at least one operator attention triggering condition. Thus, for at least some of the route points, related tunnel model information and space required by the vehicle at give route point may be processed to detect particular (operator attention requiring) route points exceeding one or more threshold value(s) set according to the operator attention triggering condition(s).

On the basis of the processing, an operator attention indicator for the at least one detected route point may be generated. Display of the operator attention indicator may be controlled at the associated route point visualized in the tunnel model. Various visualization or further attention invoking methods and outputs are available for the attention indicator, such as specific window(s), blinking, coloring, etc. The attention indicator may also apply audible indicator. For example, the tunnel model processing attention triggering may be detected in connection with route planning. Hence, the method may comprise generating/displaying the operator indicator in response to received/detected trigger. The operator alerting related features may be additional blocks to the method, after block 210, 220, or 230.

The triggering condition may comprise at least one distance between the vehicle 30 and tunnel wall 2a, 2b at associated route point. (Shortest) distance between the vehicle and the tunnel wall, or between an envelope and tunnel, are determined at different route points. The operator attention indicator may be dependent on determined distance between a given envelope and a tunnel wall. Hence, the indicator may be generated on the basis of the distance, e.g. select, from a set of available indicator options, the indicator associated with a distance range to which the determined distance falls into. For example, curves or other route portions where a vehicle corner or other portion will be close to the wall can be specifically indicated for the operator, and the operator can efficiently focus on these parts of the route when controlling the driving vehicle. In a simple example, (envelopes or further information elements for) tight corners with distance less than an associated threshold value, may be displayed as red.

In an example embodiment, distances to the wall (or other obstacles) represented by the tunnel model may be computationally defined on the basis of applying casting a set of rays from different vertical plane positions in the tunnel model. A ray cast operation refers generally to a computational ray-surface intersection test. The set of rays may thus comprise wall detection rays. The wall detection rays may be cast on both sides of the vehicle model to detect (shortest) distances to walls on both sides of the reviewed route point. The vehicle (model) and the route point may be centered between the walls at a tunnel location on the basis of processing the determined distances.

The tunnel model may comprise 3D point cloud data generated on the basis of scanning the tunnel. In block 330, a distance to tunnel wall (or another obstacle) at a ray cast direction may be determined on the basis of a set of closest/neighbouring points. Simulating the intersection point may be performed by measuring distances to neighbouring points at different points of a ray (i.e. at difference ray distances), e.g. every 10 cm. A threshold distance for registering a hit may be configured on the basis of density of the point cloud model. A hit, and thus an intersection point, may be registered at a ray point/distance when at least one point (multiple may be required) is closer than the threshold distance.

The triggering condition may comprise speed defined for the vehicle 30 for one or more route points and/or the operator attention indicator is dependent on speed for the vehicle for the route point(s). Thus, the operator can be alerted to focus on monitoring and controlling such particular point(s), e.g. where the speed of the vehicle is based on the route planning module and/or safety control system substantially limited. Different speed regions or ranges may be associated with differing UI elements. In a simple example, path portions (e.g. within the areas covered by the planned route trace based on the envelopes) of the vehicle with low speed may be displayed as green, and path portions with high speed, exceeding a threshold speed value, as red.

Thus, the operator can instantly beforehand recognize where in the planned route trace ahead particular attention should be made, and if corrective actions are required. For example, the operator may adjust speed at given route point or route portion. Since the visualization may be instantly updated after operator input (and corrective action e.g. on route point position or speed etc.), the operator may instantly obtain information if the corrective actions were enough, and provide further control inputs, if appropriate.

The presently disclosed features assist the operator to more efficiently monitor and control multiple simultaneously driving vehicles in mine areas, which may be very complex and extensive. GUI views may be provided for the operator for facilitating quickly detecting (vehicle(s) with) main problematic or risky portions along the route from less problematic ones and to prioritize actions. The present features also enable to improved assistance to the operator to detect existing or prospective bottlenecks at the planned route and provide instant reactive or proactive action control inputs. Furthermore, when space can be more efficiently utilized and route further optimized for autonomously operating vehicles, production efficiency improvements are available (e.g. due to being able to use larger vehicle, driver faster, or reduce required size of tunnels).

The space required by the vehicle 30 detected in block 210 may refer to determining the space on the basis of a set of input parameters, or receiving such space information from another entity computing the space, such as a route planning or a controller module of the vehicle. Aa set of points may be applied as a route portion and stored and processed as a spline, which may reduce processing requirements. Hence, features illustrated in FIG. 2, including the envelopes generation and subsequent envelope set visualization, may be applied on the basis of and for the set of points, such as a spline. Thus, the term route point may refer to more than a single geographical point and may refer to a route portion defined by a set of geographical points.

The space required by the vehicle 30, for the envelope at the associated route point, may be determined on the basis of processing vehicle dimensions data, and data on expected state of the vehicle at the associated route point. The dimensions data may be specific to vehicle category/type, model, or specified to each vehicle, for example. It is to be noted that a dynamic or predetermined margin may be added on outer dimensions of the vehicle. Further, the envelope may be specified in various forms. For example, a drill rig may have an envelope, which extends from a rectangular form by area(s) covering one or more drilling booms. The expected state may comprise vehicle speed at the route point, and may also comprise steering angle α of the vehicle at the route point, if the environment sensing is in relation to vehicle coordinates. However, also other vehicle state parameters that may be relevant for defining the envelope, such as vehicle location, heading and orientation if wall information is in relation to worksite coordinates.

Two or even more envelopes, or sub-envelopes, may be generated in block 220 for each associated route point. Thus, the set of envelopes may comprise two or more (sub-)envelopes for each route point. These envelopes may be applied to visualize the planned route trace in block 230, or one or more further envelopes are displayed as complementary information (layer).

In an example embodiment, with reference to example of FIG. 3, for the articulated vehicle 30, a front portion envelope 34 may be generated based on space required by the front portion 32, and a rear portion envelope 38 may be generated based on space required by the rear portion 36 at the associated route point (e.g. point 42). The envelopes may be generated on the basis of dimensions of the respective machine portion and dynamic information, such as speed and/or articulation angle between the front portion and the rear portion at respective route point. Display of the front portion envelope and the rear portion envelope are controlled as visually separated, e.g. by different colours or other visual differentiation method. The envelopes may be displayed at different vertical plane positions, i.e. have differing vertical (z) direction coordinates.

Figure 4A:
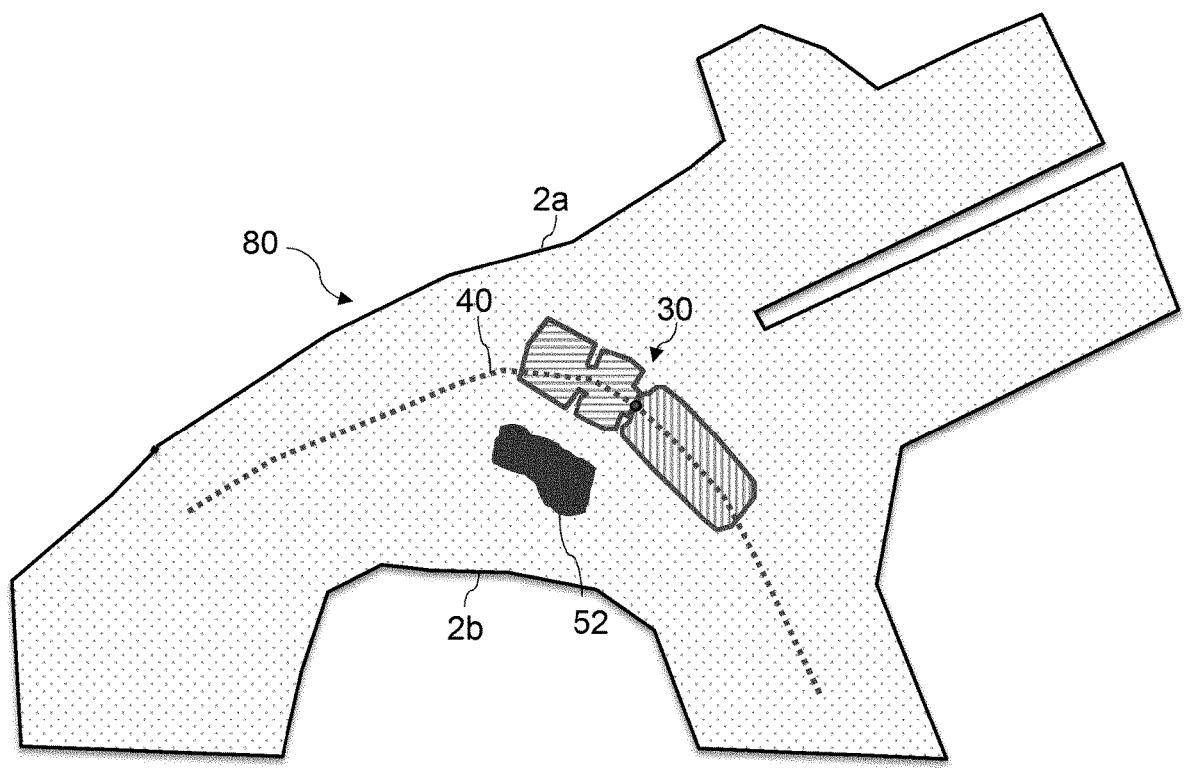

FIG. 4a illustrates an example in which only trajectory path based on route points 40 is illustrated in a tunnel model 80. As can be seen, it may be difficult especially for an unexperienced operator to detect potentially problematic portions in a complex underground tunnel system.

Figure 4B:
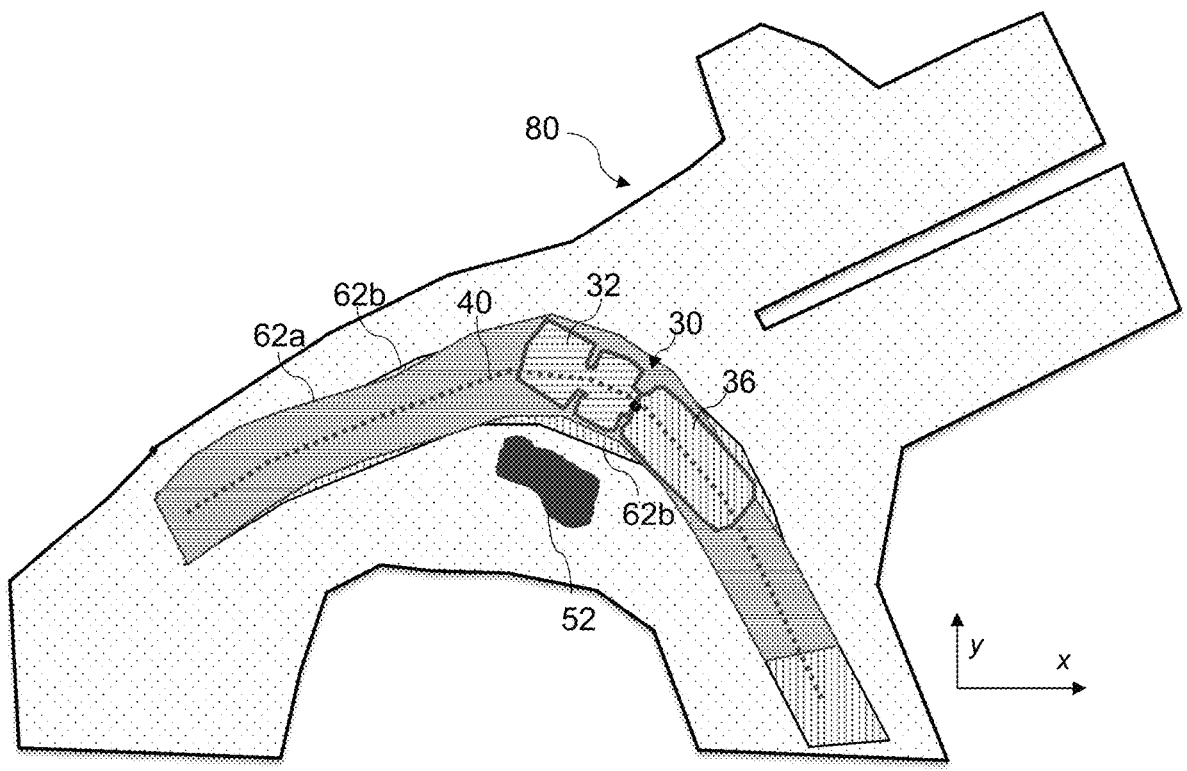

FIG. 4b illustrates an example, in which the planned route front (body) portion trace 62a based on a set of front portion envelopes 34 and a rear (body) portion trace 62b based on a set of rear portion envelopes 38 are generated and displayed. These envelopes and/or traces may be displayed as visually separated and/or at different vertical plane levels. These have been noticed to provide substantial assistance, particularly for the unexperienced operators to understand machine space requirement and how close to an obstacle it will be in a narrow tunnel portion, and facilitate effective and focused monitoring and control of a fleet of vehicles.

The tunnel model may be a 3D model and the envelope is displayed as a 2D or 3D layer on the route point (which may extend to cover a set of route points or a spline, as already indicated). As already illustrated, a plurality of envelopes, and also further assistive information, may be displayed on the route point. The envelopes and potential further information may be displayed as specific separate layers on the route point. Effective visualization and separation of different information becomes crucial as the amount of information on the route point increases. In order to more efficiently detect the different information, a plurality of layers at different vertical plane positions (at different vertical/z direction positions) are applied.

Figure 5:
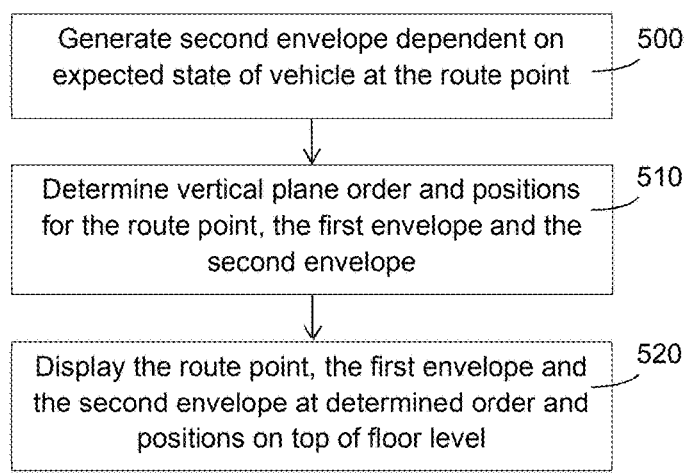
FIG. 5 describes a method according to at least some embodiments.

FIG. 5 illustrates a method which may be applied in connection with the method of FIG. 2, or as further steps thereto. Blocks of FIG. 5 illustrate operations for a single route point, but it will be appreciated that they may be repeated for at least some of the route points in the set, to visualize further route point specific information in addition to or as part of the planned route trace visualized in block 230.

In addition to a first envelope (e.g. on the basis of which the planned route trace may be generated), a second envelope is generated 500 for a given route point. The second envelope may be dependent on (and defined based on) expected or defined state of the vehicle at the route point, such as speed of the vehicle. Layer order or positioning parameters may be configured as control parameters affecting positioning of the layers in the display view.

Vertical plane order and positions may be determined 510 for the route point, the first envelope and the second envelope. Layers selectively prioritized may be dynamically positioned on top. The method may thus further comprise:
- determining a first vertical plane position for the first envelope at the associated route point, wherein the first vertical plane position is different from a second vertical plane position defined for visualizing the route point in the tunnel model. The first and second vertical plane positions also preferably differ from vertical plane tunnel floor level or portion defined by the tunnel model at the route point,
- determining at least one third vertical plane position for the second envelope, and
- controlling display of the first envelope at the first vertical plane position, the route point at the second vertical plane position, and the second envelope at the third vertical plane position at the associated route point.

In one example prioritization and ordering of information layers (from bottom to upwards in vertical plane z direction), route points or route point spline may be positioned above the floor level, the first envelope is positioned above the route points, and the second envelope is positioned above the first envelope.

These operations may be repeated for consecutive route points and envelopes, and resulting traces at differing vertical plane (z) levels obtained. It will be appreciated that more than two layers may be generated and positioned by applying the above methods. Further, instead of envelope, block 500 may comprise generating a vehicle state indicator or operator attention indicator, which is then positioned at different vertical plane position than the first envelope. Another example comprises:
- generating an obstacle detection zone indicator 50 indicative of an obstacle detection area determined for the vehicle 30 for monitoring presence of obstacles at a route point in the set of route points, wherein the obstacle detection area is dependent on expected state of the vehicle at the route point,
- determining a third vertical plane position for the obstacle detection zone indicator, and
- controlling display of the obstacle detection zone indicator at the third vertical plane position at the route point.

Also, it is not necessary to display the route points, but in some UI generation embodiments only the envelope(s) and the potential further route-point specific information are displayed at the route point position in the tunnel model.

Figure 6:
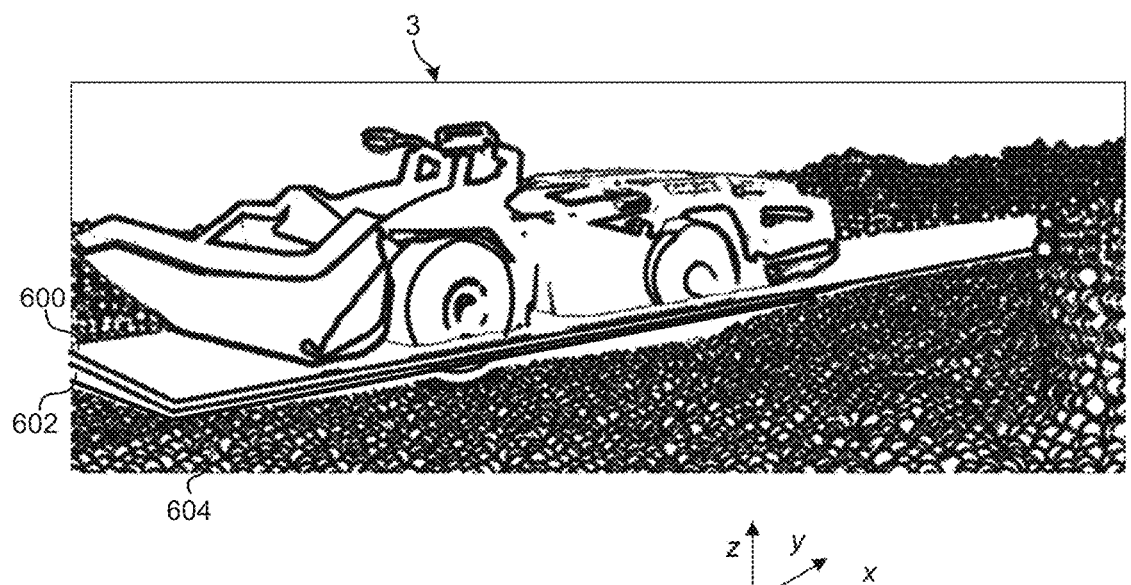
FIGS. 6 and 7 illustrate example display views of vehicles with envelope information.

FIG. 6 illustrates an example 3D visualization, in which at least two layers or planned route traces 600, 602 at different heights are illustrated, i.e. having differing (z) vertical plane levels (for simplicity only parts of the (thin) planned future traces). These traces may be generated based on the set of envelopes, such as the front body envelopes 34 and rear body envelopes 38. However, one of the layers 600, 602 may comprise and be generated on the basis of non-envelope based input. For example, layer 600 may illustrate obstacle detection zone or an operator attention indicator. In a further example, an operator may be provided with a selector, by which the traces 600, 602 or layers to be shown may be selected.

Figure 7:
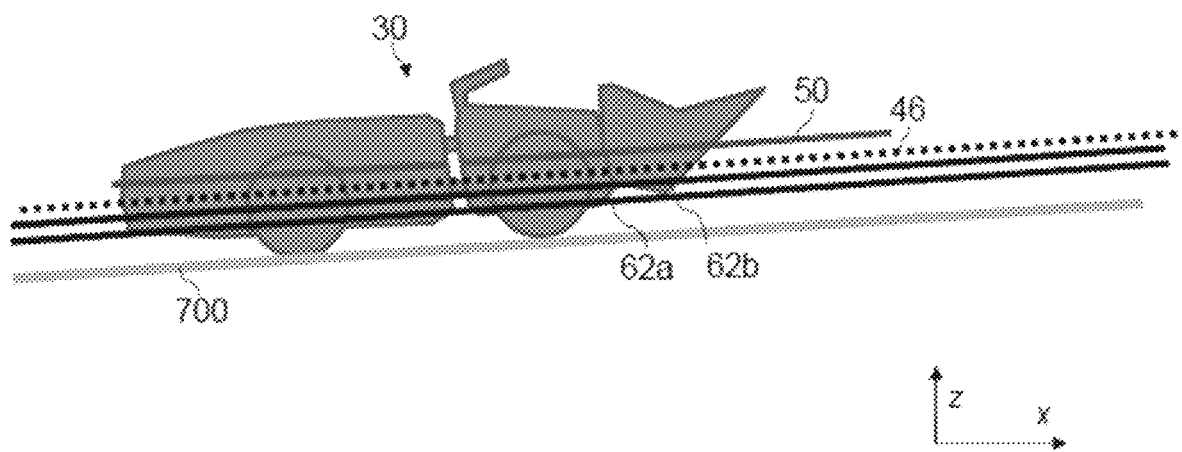

In a still further example, with reference to simplified side view of FIG. 7, different information layers/envelopes are ordered and displayed as follows (from bottom to upwards in vertical plane z direction):
- Display the road (at least tunnel floor surface) 700 and the potential further 3D environment as defined in the tunnel model, since it illustrates the real environment showing known obstacles and walls,
- Display the rear body envelope 38 and resulting planned route trace 62b slightly above the road surface (which may be positioned slightly higher than typical road surface shapes). The surface of the planned envelope visualization may thus be maintained uniform and the map/environment visualization does not "stick" through it.
- Display the front body envelope 32 and resulting planned route trace 62a slightly above the rear body envelope 38 so better visible for the operator. Differences to the rear body peak may be positioned lowed it if they differ.
- Display the route spline 46 above the front body envelope 32, preferably so it shows clearly on top.
- Display the collision or obstacle detection zone indicator 50 above the route spline since it is often considered most important for real time situations, and allows the operator to quickly detect e.g. why the vehicle decided to stop.

It will be appreciated that the above order is just an example, and the various other orders of the layers and envelopes may be applied, and one or more of them may be omitted (or further layers/envelopes applied). It is to be noted that the envelopes may be applied as inputs for automatically controlling the vehicle. The envelopes may be applied as inputs for collision prevention function and obstacle detection. Another example is that inclination of envelope(s) may be applied as input for a slope decelerator, which automatically decelerates the vehicle e.g. when going down a tunnel ramp.

The operator may be provided with an option to provide input to obtain further information, change path or other route plan parameters at one or more associated route points, control path for the vehicle and/or control the vehicle at or before the route point(s).

In addition to visualizing the planned route trace and operator-attention requiring route portions, there are various further actions that may be invoked to assist the operator, when designing or testing a route plan, or monitoring autonomously operating vehicles in the worksite. Some further examples include providing guidance for the operator, generating a corrective control action for the vehicle, or suggesting a control action or route (point) parameter change for the operator.

The input may be provided via a display or another input device and a GUI interface to a data processing unit (DPU) configured to perform at least GUI related processing in accordance with the user input. The GUI processing may be performed by a GUI processing module configured to generate or at least control GUI displayed to an operator by a display via the GUI interface. The GUI processing module may be configured to perform at least some of the above illustrated features, such as blocks 220-230 and 500-520.

The control system 9, such as the DPU may be configured to detect locations of vehicles, e.g. based on the position data from the vehicles 4-6 or a positioning service. This may be performed for some or all of the vehicles 4-6 at the work site 1. The locations of the vehicles are mapped the tunnel model. Vehicle models may be displayed, with the envelope visualization in the tunnel model on the basis of the mapped locations.

The DPU, or the associated control system 9, may further comprise a vehicle control module or unit configured to generate control commands to a vehicle on-board control system on the basis of associated user inputs after displaying 230, 420 the envelopes(s) and other route point specific information for a particular vehicle. In response to receiving (user) control input(s) from the operator via an input device, control commands are transmitted to a vehicle to control at particular route points or event of the autonomous task, e.g. to overcome an alert or underperformance issue.

After the control commands are executed in the associated vehicle, new vehicle and/or drive order related data, such as positioning information, may be received by the DPU and at least some of the above features may be repeated, e.g. blocks 220 and 230. Then, an updated vehicle operations status view, which may include updated envelopes and resulting planned route trace visualization, may displayed to the operator. The earlier displayed operator attention indicator may also be updated according to the updated received data, and may be even removed if the operator attention triggering condition does no longer exist.

Vehicle state related data may be processed to detect at least one corrective control action for vehicle and/or route plan to address the situation and condition detected to trigger the operator attention. This may comprise defining control actions for one or more vehicles, for example. Control information for mapping vehicle state condition or event cause information with one or more operator guidance element and/or the corrective action may be stored in data storage of the DPU. The control signal and/or contents of the operator guidance element may thus be generated or selected on the basis of the control information. For example, control command(s), guidance information record(s), or data element(s) matching with vehicle type and alert identifier or further event charactering information are selected.

Control signal(s) associated with the determined control command(s) and the mine operations device(s) may be transmitted, in response to detecting that an imperative condition for automatic control is met. Alternatively, the corrective action(s), and the associated vehicle(s) and control command(s) may be indicated for the operator, e.g. by generating an operator guidance GUI element. In an embodiment, the operator is provided with an input option, via which the operator may directly trigger the transmission of the determined control signal(s).

It is to be appreciated that various further features may be complement or differentiate at least some of the above-illustrated embodiments. For example, there may be further user interaction and/or automation functionality further assisting the operator to design route plans or monitor and control vehicles and operations/settings thereof.

Figure 8:
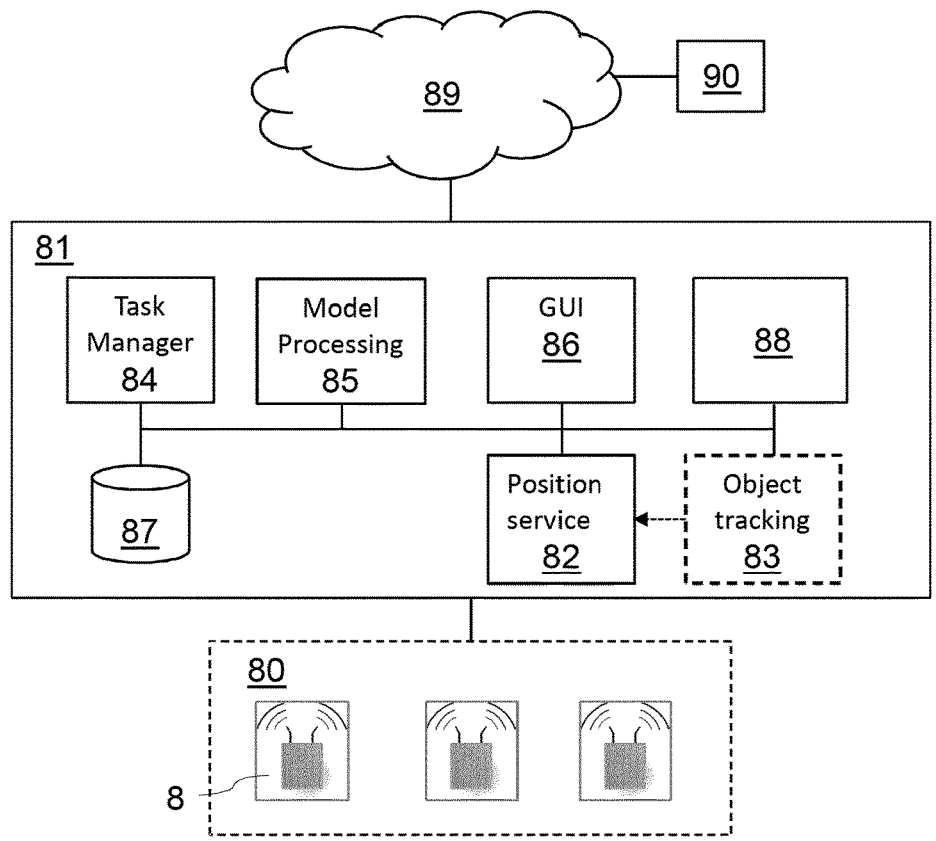
FIG. 8 illustrates an example system according to at least some embodiments.

FIG. 8 illustrates operational modules of a mine operations control apparatus or system, such as a server 81 according to some embodiments. An object tracking module 83 may be configured track location of mobile objects and to provide 3D position indicator to further modules, such as a position service module 82.

The server 81 may comprise a task manager or management module 84, which is configured to manage at least some operations at the worksite. For example, the task manager may be configured to assign work tasks for a fleet of work machines and update, send control signals to the work machines, and/or monitor work machine task performance and status, which is indicated at a task management GUI.

The server 81 may comprise a model processing module 85, which may maintain one or more models of the underground worksite, such as the 3D tunnel model. The model processing module 85 is configured to map vehicle models and associated envelope(s) to the tunnel model.

The server 81 may comprise a GUI module 86, which is configured to generate at least some display views for an operator (locally and/or remotely). The GUI module 86 may be configured to generate, on the basis of the 3D model or floor model, a 3D (and/or 2D) view comprising current positions of the vehicles, associated envelopes visualization, and operator attention indicators by applying at least some of the above illustrated embodiments.

The server 81 may comprise further module(s) 88, such as a remote monitoring process and UI, an event processing module configured to process mine operations data, and/or a cloud dispatcher component configured to provide selected worksite information, such as vehicle monitoring information to a cloud service.

The system and server 81 may be connected to a further system 90 and/or network 89, such a worksite management system, a cloud service, an intermediate communications network, such as the internet, etc. The system may further comprise or be connected to a further device or control unit, such as a handheld user unit, a vehicle unit, a worksite management device/system, a remote control and/or monitoring device/system, data analytics device/system, sensor system/device, etc.

The object tracking 83 may be implemented as part of another module, such as the position service module 82. The position service 82 is configured to provide, upon request or by push transmission, mobile object position information obtained from or generated on the basis of information from the object tracking 83 for relevant other modules or functions, such as the database 87, the visualizer graphical user interface 86, and/or remote units or systems 70 via one or more networks 89. In the example of FIG. 8 the modules are illustrated as inter-connected, but it is to be appreciated that not all modules need to be connectable.

The system may comprise or be connected to a control unit or module of a work machine or another mine operations device for which e.g. control commands may be transmitted. In an example embodiment, the control unit may be provided in each autonomously operating vehicle and be configured to control at least some autonomous operations of the vehicle on the basis of the received control commands.

An electronic device comprising electronic circuitries may be an apparatus for realizing at least some embodiments of the present invention, such as the method illustrated in connection with FIG. 2. The apparatus may be comprised in at least one computing device connected to or integrated into a worksite control or automation system or a vehicle. The apparatus may be a distributed system comprising a set of at least two connectable computing devices. At least one of the features illustrated in connection with FIG. 2 (and/or embodiments thereof) may be performed in a first device and other feature(s) may be performed in a second device, which are connected via a wireless and/or wired connection. At least some of the features may be performed in a server or other type of control unit available for an operator remotely controlling the vehicle and/or generating the route point data for the vehicle. For example, envelope generation (blocks 200 to 220) may be performed in a first device, such as a server or a safety control device, and the visualization and display of the envelopes may be performed in a second device, such as the vehicle or a UI control device.

In some example embodiments, edge computing is applied, whereby some features, such as blocks 200-210/220, may be performed at an edge node, which may reside e.g. at vehicles. For example, processing of 3D scanning data may be performed at an edge node. The edge node may perform positioning function and update and/or generate (in case of SLAM) the tunnel model. The edge node may perform route generation, which may also generate envelopes along the route. The edge node may perform collision prevention related features, including obstacle detection. Obstacle detection function (by an edge node or another control unit) may receive as input the envelopes, scanning data, and machine dynamics limitations, and detect if the vehicle may collide onto an object. An edge node (or another control unit) in the vehicle may control real-time communication of vehicle position and status data to a controller unit, in which a monitoring function may be configured to slow down or stop the machine if required.

Figure 9:
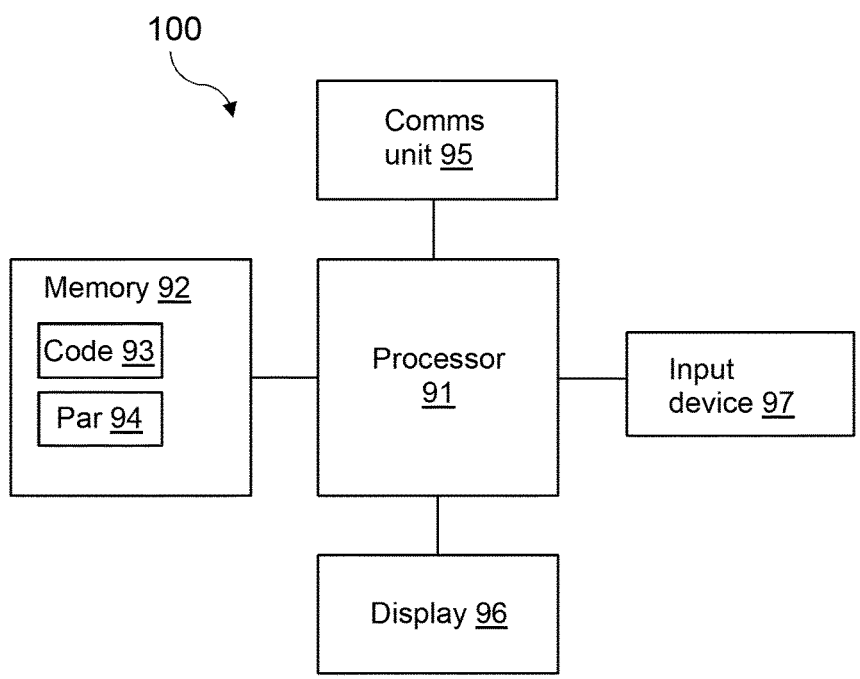
FIG. 9 illustrates an example apparatus capable of supporting at least some embodiments of the present invention.

FIG. 9 illustrates an example apparatus capable of supporting at least some embodiments of the present invention. Illustrated is a device 100, which may be configured to carry out at least some of the embodiments relating to the vehicle monitoring and envelope display related features illustrated above, such as at least some of the blocks of FIG. 2. For example, the device 100 may comprise or implement the DPU.

Comprised in the device 100 is a processor 91, which may comprise, for example, a single- or multi-core processor. The processor 91 may comprise more than one processor. The processor may comprise at least one application-specific integrated circuit, ASIC. The processor may comprise at least one field-programmable gate array, FPGA. The processor may be configured, at least in part by computer instructions executed in the processor, to perform actions.

The device 100 may comprise memory 92. The memory may comprise random-access memory and/or permanent memory. The memory may be at least in part accessible to the processor 91. The memory may be at least in part comprised in the processor 91. The memory may be at least in part external to the device 100 but accessible to the device. The memory 92 may be means for storing information, such as parameters 94 affecting operations of the device. The parameter information in particular may comprise parameter information affecting e.g. the display element and envelopes generation and/or visualization, such as threshold values. The memory 92, or another memory or storage device connectable to the device 100, may further comprise input data to be processed by the device, such as a route plan file, vehicle dimensions data, and/or tunnel model applied as illustrated above.

The memory 92 may comprise computer program code 93 including computer instructions that the processor 91 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method blocks in the device.

The device 100 may comprise a communications unit 95 comprising a transmitter and/or a receiver. The transmitter and the receiver may be configured to transmit and receive, respectively, i.a. vehicle monitoring related data and control commands in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, and/or Ethernet, for example. The device 100 may comprise a near-field communication, NFC, transceiver. The NFC transceiver may support at least one NFC technology, such as NFC, Bluetooth, or similar technologies.

The device 100 may comprise or be connected to a UI. The UI may comprise at least one of a display 96, a speaker, an input device 97 such as a keyboard, a joystick, a touchscreen, and/or a microphone. The UI may be configured to display views on the basis of the worksite model(s) and the mobile object position indicators. A user may operate the device and control at least some features of a control system, such as the system illustrated in FIG. 6. The user may control a vehicle 4-7 and/or the server via the UI, for example to change operation mode, change display views, modify parameters 94 in response to user authentication and adequate rights associated with the user, etc.

The device 100 may further comprise and/or be connected to further units, devices and systems, such as one or more sensor devices 98 sensing environment of the device 90.

The processor 91, the memory 92, the communications unit 95 and the UI may be interconnected by electrical leads internal to the device 100 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processor, at least one memory including computer program code, the at least one memory and the computer program code being configured to, with the at least one processor, cause the apparatus to:
obtain route plan information defining a route to be driven by an articulated vehicle including a front portion and a rear portion articulably coupled to the front portion, the route plan information being indicative of a set of route points for a tunnel system of an underground worksite for at least partially autonomous driving of the articulated vehicle;
detect, for at least some route points in the set of route points, space information for the at least some route points in the set of route points, the space information being indicative of spaces required by the front portion and the rear portion of the articulated vehicle at associated route points based on dimensions of the respective machine portion and an articulation angle between the front portion and the rear portion;
generate a set of route point specific envelopes on the basis of the space information, wherein a front portion envelope is indicative of space required by the front portion and a rear portion envelope is indicative of space required by the rear portion at an associated route point; and
control visualization of the set of route point specific envelopes at the associated route points in a tunnel model to represent a planned route front portion trace and a rear portion trace of the articulated vehicle when driving via the route points.

2. The apparatus of claim 1, wherein the at least one memory and the computer program code are further configured to, with the at least one processor, cause the apparatus to:
process the tunnel model and the space information to detect at least one route point meeting at least one operator attention triggering condition;
generate an operator attention indicator for the at least one detected route point; and
control display of the operator attention indicator in the tunnel model for the at least one detected route point.

3. The apparatus of claim 2, wherein the at least one triggering condition comprises at least one distance between the vehicle and tunnel wall or other obstacle at a route point in the set of route points, and/or the operator attention indicator is dependent on determined distance between an envelope in the set of envelopes and a tunnel wall or other obstacle.

4. The apparatus of claim 2, wherein the at least one triggering condition comprises a speed for the vehicle for at least one route point in the set of route points and/or the operator attention indicator is dependent on the speed defined for the vehicle at the at least one route point.

5. The apparatus of claim 3, wherein the detecting the space information comprises determining, for the envelope, space required by the vehicle at the associated route point on the basis of processing vehicle dimensions data and data on expected state of the vehicle at the associated route point.

6. The apparatus of claim 5, wherein the expected state comprises vehicle speed and steering angle at the associated route point.

7. The apparatus of claim 1, wherein the at least one memory and the computer program code are further configured to, with the at least one processor, cause the apparatus to:
determine a first vertical plane position for an envelope in the set of envelopes, wherein the first vertical plane position is different from a second vertical plane position defined for visualizing a further envelope, a vehicle state indicator, or a route point associated with the envelope; and
control display of the envelope at the first vertical plane position and the further envelope, the vehicle state indicator or the route point at the second vertical plane position in the tunnel model.

8. The apparatus of claim 7, wherein the at least one memory and the computer program code are further configured to, with the at least one processor, cause the apparatus to:
generate an obstacle detection zone indicator indicative of an obstacle detection area determined for the vehicle for monitoring presence of obstacles at a route point in the set of route points, wherein the obstacle detection area is dependent on expected state of the vehicle at the route point;
determine a third vertical plane position for the obstacle detection zone indicator; and
control display of the obstacle detection zone indicator at the third vertical plane position at the route point.

9. The apparatus of claim 1, wherein the tunnel model is a three-dimensional model indicative of the tunnel system and the envelopes are combined and displayed as a two-dimensional or three-dimensional layer positioned on the route point according to layer order or positioning parameters.

10. An underground worksite monitoring system, comprising one or more data processing devices, one or more user interface devices, one or more data storage devices and one or more communications devices, wherein the system comprises the apparatus according to claim 1.

11. A method comprising:
- obtaining route plan information defining a route to be driven by an articulated vehicle including a front portion and a rear portion articulably coupled to the front portion, the route plan information being indicative of a set of route points for a tunnel system of an underground worksite for at least partially autonomous driving of the articulated vehicle;
- detecting, for at least some route points in the set of route points, space information for the at least some route points in the set of route points, the space information being indicative of spaces required by the front portion and the rear portion of the articulated vehicle at associated route points based on dimensions of the respective machine portion and an articulation angle between the front portion and the rear portion;
- generating a set of route point specific envelopes on the basis of the space information, wherein a front portion envelope is indicative of space required by the front portion and a rear portion envelope is indicative of space required by the rear portion at an associated route point; and
- controlling visualization of the set of route point specific envelopes in a tunnel model to represent a planned route front portion trace and a rear portion trace of the articulated vehicle when driving via the route points.

12. The method of claim 11, further comprising:
- processing the tunnel model and the space information to detect at least one route point meeting at least one operator attention triggering condition;
- generating an operator attention indicator for the at least one detected route point; and
- controlling display of the operator attention indicator in the tunnel model for the at least one detected route point.

13. The method of claim 11, further comprising determining, for the envelope, space required by the vehicle at the associated route point on the basis of processing vehicle dimensions data and data on expected state of the vehicle at the associated route point.

14. A computer program comprising code for, when executed in a data processing apparatus, causes the apparatus to perform the method of claim 11.

15. The apparatus of claim 1, wherein the at least one memory and the computer program code are further configured to, with the at least one processor, cause the apparatus to control display of the front portion envelope and the rear portion envelope as visually separated.

* * * * *